(12) United States Patent
Bhargava

(10) Patent No.: US 11,848,130 B1
(45) Date of Patent: Dec. 19, 2023

(54) STRONG NON RARE EARTH PERMANENT MAGNETS FROM DOUBLE DOPED MAGNETIC NANOPARTICLES

(71) Applicant: Rameshwar Bhargava, Ossining, NY (US)

(72) Inventor: Rameshwar Bhargava, Ossining, NY (US)

(73) Assignee: Nano Theranostics, Tarrytown, NY (US)

( * ) Notice: Subject to any disclaimer, the term of this patent is extended or adjusted under 35 U.S.C. 154(b) by 859 days.

(21) Appl. No.: 16/548,020

(22) Filed: Aug. 22, 2019

Related U.S. Application Data

(60) Provisional application No. 62/721,122, filed on Aug. 22, 2018.

(51) Int. Cl.
| | | |
|---|---|---|
| *H01F 1/11* | (2006.01) | |
| *C01G 49/00* | (2006.01) | |
| *C01G 51/00* | (2006.01) | |
| *C01G 53/00* | (2006.01) | |
| *B82Y 25/00* | (2011.01) | |

(52) U.S. Cl.
CPC .......... *H01F 1/11* (2013.01); *C01G 49/0072* (2013.01); *C01G 51/40* (2013.01); *C01G 53/40* (2013.01); *B82Y 25/00* (2013.01); *C01P 2002/52* (2013.01); *C01P 2004/64* (2013.01); *C01P 2006/42* (2013.01)

(58) Field of Classification Search
CPC ....................................................... H01F 1/11
See application file for complete search history.

(56) References Cited

PUBLICATIONS

Kumar et al. "Metal-semiconductor transition and Seebeck inversion in CoFe2O4 nanoparticles" Journal of Physics and Chemistry of Solids, 105, 2017, 86-89. (Year: 2017).*
Baron et al. The influence of iron substitution on the magnetic properties of hausmannite, Mn2+(Fe, Mn)2(3+)O4, American Mineralogist, vol. 83, 1998, p. 786-793. (Year: 1998).*
Baykala et al. "Magnetic Properties and Cation Distribution of Bimetallic (Mn—Co) Doped NiFe2O4 Nanoparticles" J Inorg Organomet Polym, 2017, 17:1893-1900. (Year: 2017).*
Mande et al. "Effect of Simultaneous Doping of Zinc and Chromium on the Structure and Magnetic properties of NiFe2O4 Nanoparticles" International Journal of Chemical and Physical Sciences, vol. 7, ICAFM(Part-II) Mar. 2018, 579-584. (Year: 2018).*

* cited by examiner

*Primary Examiner* — Peter F Godenschwager
(74) *Attorney, Agent, or Firm* — William L. Botjer

(57) ABSTRACT

A magnetic nanoparticle, and composites thereof, comprising a ternary host compound comprising a transition metal oxide of size 2-30 nm having two transition metal dopants atom incorporated therein, such that the nanoparticle is converted from superparamagnetic or weak ferromagnetic to strong ferromagnetic material. The strong permanent magnets are formed from non-rare earth materials. The composite material can also include undoped nanoparticles.

4 Claims, 4 Drawing Sheets

STRONG NON RARE EARTH PERMANENT MAGNETS FROM DOUBLE DOPED MAGNETIC NANOPARTICLES

BACKGROUND OF THE INVENTION

This invention relates to the formation of strong permanent magnets and particularly to such magnets formed from non-rare earth materials through the incorporation of double dopants in a ternary compound.

Most powerful motors require a strong permanent magnet-to function. The magnet must not only be strong (large magnetic remanence and coercivity), it must be capable of functioning without loss of magnetic power at high temperatures. The high performance magnets that are used in electric vehicles today are Neodymium (Nd) based magnets. These Nd-based magnets face two critical problems. Firstly, Nd, a rare-earth element, is in short supply and is primarily mined in a single country. The future auto industry offering electric vehicles, desperately needs to reduce its dependence on expensive rare earth element Nd-based magnets with the supply of Nd under the control of a single country. Secondly, the performance of these magnets at high temperatures (>100 C) needs to improve. In particular, Nd-based magnets performance diminishes as the temperature increases and ceases to operate above the Curie temperature of 300 C.

The present application's assignee Nanotheranostics, Inc. (NTI) has invented and developed novel nanomagnets-system that overcome the above mentioned limitations of Nd-based magnets. Furthermore, the present integrated nanomagnet technology will surpass the performance of Nd-based magnets at room and high temperatures. We have employed two levels of engineering improvements in developing permanent magnet materials: first, improving intrinsic, magnetic properties by atomic structuring the crystalline/magnetic properties of nanoparticles and second developing extrinsic magnetic properties by integrating the nanomagnets for powerful bulk permanent magnets. Such an integration process will yield light-weight permanent magnets that possess large magnetic anisotropy, are thermally stable even at moderate high temperatures and can be molded into the desirable shape. The rare-earth 'free' permanent magnets with high performance should capture significant market in the next decade.

Our discovery is based on the use of inexpensive common transition metal elements like iron, cobalt and manganese. our discovery of Doped Magnetic NanoParticles (DMNP) based magnets suggests that the present magnets retain the operation beyond 300 C without any significant decrease in magnetic properties. The evolution of nanomagnets is described in FIG. 1A-E. We have made the discovery where the above mentioned barriers in nano-magnetism have been eliminated. We have developed a new class of magnetic materials by incorporating another impurity atom (doping) in known paramagnetic, ferrimagnetic or ferromagnetic nanomaterials that created the first high temperature nanomagnet. This is similar to semiconductors where multiple thin layers are engineered to create novel properties, such as hetero-structure semiconductor lasers, that operate at high powers at room temperature and beyond, a backbone of optical communication industry. It is much more like introducing a dopant into the semiconductor to control the recombination region and its properties to tailor the properties of the semiconductor. Similar to semiconductor optoelectronic chip, when we introduce a magnetic dopant in paramagnetic nanomaterial, it generates a high temperature ferromagnetic material where spin-exchange interaction between dopant spin and host spin is dominant. This phenomena is dependent on the size of the host nanocrystal, It works best when the nanoparticles are in the size-range between 5-50 nm These doped magnetic nanoparticle (DMNP) based nanomagnets depicted in FIG. 1 now can be used as the building block for creating future macro-magnets. With this major breakthrough these engineered macro-magnets have distinct advantages over conventional rare-earth magnets. To make bulk permanent magnets, our nanomagnet powder material will be compacted in the presence of high magnetic field with isostatic pressure at moderate temperatures to create magnets of appropriate shape and size for specific applications.

To further improve the results obtained in an earlier work ("Doped Magnetic Nanoparticles" described in PCT/US2018/019458; the disclosure of which is hereby incorporated by reference) where we used $Fe^{2+}$, doping of $Mn_3O_4$, we decided to look for a nanocrystalline magnetic system that when doped with magnetic impurities, can generate much higher coercivity permanent magnets that will have comparable performance to that of Nd based RE magnets. In order to develop bulk magnets, we must consider that these doped magnetic nanoparticle (DMNP) based nanomagnets are to be used as the building blocks for creating macro-magnets. The nanopowder must be compacted in the presence of externally applied high magnetic fields and high-pressure. The resultant macro-magnets will have distinct advantages over the conventional micron-size rare-earth particles which are multi-domain magnets. This enhancement of properties of permanent magnets is based on not only improvement of the magnetic properties of nanoparticles but also development of a nanocomposite system which is a combination of soft magnetic nanoparticles (superparamagnetic or weak ferromagnetic with high magnetic saturation) and hard magnetic nanoparticles (ferromagnetic nanomaterial with high coercivity). The composite of soft and hard magnetic have so far failed to replace RE-PM. magnets but it may be feasible soon with current intense theoretical and experimental undertakings. It is expected that in next few years we may surpass the performance of Rare-Earth based permanent magnets (RE-PM). In this patent we identify the nanocomposite of hard and soft magnetic nanoparticles that is ideal for replacement of RE-PM magnets.

SUMMARY OF THE INVENTION

For the next generation of high performance rare-earth permanent magnets (RE-PM) we must (i) significantly reduce or eliminate the use of critical materials such as rare-earth (RE) and cobalt (Co) and (ii) improve performance of these magnets over 200 C. In order to achieve the above criteria, it is generally accepted that an integrated nanocomposite of soft and hard magnetic nanomaterials, can perform better than RE (Nd—Fe—B or Sm—Co) based permanent magnets). This was theoretically proposed by Kneller and Hawig In 1991 [Kneller, E. F.; Hawig, R. "The exchange-spring magnet: a new material principle for permanent magnets". IEEE Transactions on Magnetics. 27 (4): 3588, (1991)] where superior permanent magnets (PM) can be made from nanocomposite of hard (high coercivity, Hc) and soft (high saturation magnetization, Ms) magnetic materials. The magnetic interaction referred as ' exchange spring or exchange-hardened' between hard and soft components 'enhances the performance of PM which can be expressed as the figure of merit $(BH)_{max}$ product' of this Nanocomposite of Hard and Soft (NC-HS) magnet beyond the value any individual phase that form the nanocomposites. FIG. 2 schematically represents the projected performance of nanocomposite of hard and soft material based on Kneller and Hawig spring—exchange model. An exchange spring interaction to work efficiently in *NanoComposite of Hard and Soft* (henceforth referred as NC-HS magnet) magnetic system's energy product $(BH)_{max}$ must be greater than that in RE-PM. In order to engineer certain magneto-structural properties of soft and hard components as predicted from theory [[Giant energy product in nanostructured two phase magnets, R. Skomski & J. M. D. Coey Phys. Rev. B48, 15812, 1993 and Predicting the future of Permanent-Magnets materials R. Skomski et. al. IEEE Trans. o Magnetics, 49, 3215, 2013], we should simultaneously satisfy; i) Microstructural parity between hard and soft nanomaterial primarily the interfaces be crystallographically coherent ii) Spin alignment i.e magnetic axes be the same among the hard nanoparticles through out magnet, iii) the axis of magnetization of soft and hard material should coincide and iv) the size of hard and soft magnets has to be in the size of 10 to 20 nm. This size range allows exchange interaction among the nanoparticles to make the NC-HS to be exchanged hardened and enhance the performance as permanent magnet and v) the ratio of hard to soft magnetic nanoparticles controls the overall performance NC-HS permanent magnets and the required volume fraction of the hard phase could be between 30% to 50%.

In NC-HS for "exchange-spring" mechanism to work efficiently the interfacial exchange coupling between the magnetically soft and hard phases hardens the soft phase and thereby enhances remanence and reversibility. This interaction in nano-scale regime would then lead to ultra-strong permanent magnets with projected energy product $(BH)_{max}$ that is more than twice that of Nd—Fe—B. Currently, lack of 'perfect' NC-HS materials has prevented from developing appropriate manufacturing process and hence the replacement of RE-PM. Current limited results on NC-HS have so far not succeeded in generating magneto-structural parameters in NC-HS system for it to produce permanent magnet comparable to RE-PM. To develop aligned hard-soft nanocomposites require challenging processing requirements. In these structures, the soft-phase material improves the hard-magnetic performance sacrificing some anisotropy and coercivity but enhancing magnetization and energy product beyond the hard phase.

The exchange-coupling interactions between the grains in the nanocomposite permanent materials increase with the reduction of grain size due to increased interparticle magnetic interaction The decrease of coercivity for nanocomposite magnets is mostly caused by the reduction of effective anisotropy. Because the remanence and the effective anisotropy have the opposite variation trend with the change of grain size and phase ratio, the grain size should be in the range of 10-15 nm to obtain magnets with higher energy product. We demonstrate that doped magnetic nanoparticles (DMNP) could simultaneously produce hard and soft nanoparticles and yield higher coercivity and remanence due to incorporation of single dopant in MNP. To understand why we have difficulty in engineering the NC-HS magnets that perform better than RE-PM, let us review the dependence of coercivity as a function as the nanoparticle size. This is shown in FIG. 3. For metal The nanosize of both hard and soft material should be 10-20 nm. It should be noticed that in ferrite system, Co and Sr ferrites remain slightly ferromagnetic in this range. However, $Fe_3O_4$, $Mn_3O_4$ or $Fe_2O_3$ in this size range are superparamagnetic (soft phase). In particular, to develop NC-HS permanent magnets from ferrites requires that magnetic nanoparticles should possess high coercivity (>10 KOe). To overcome the rapid decrease in size range below 30 nm, we had a breakthrough where by incorporating a single impurity as a dopant in nanocrystals of ferrite system, reversed the trend shown in FIG. 3. The impurity incorporation creates the nanomagnets for NC-HS as shown in FIG. 1. This patented technology breakthrough satisfies the majority of the requirements of spring-exchange NC_HS magnets.

DESCRIPTION OF THE PREFERRED EMBODIMENTS

One point should be emphasized that certain compounds such as $Mn_3O_4$ can be considered as ternary since Mn has two distinct oxidation states $Mn^{2+}$ and $Mn^{3+}$ along with $O^{2-}$. Thus ferrites expressed as $MFe_2O_4$, a ternary compound where M could be $Mn^{2+}$, $Fe^{2+}$, $Co^{2+}$ or $Ni^{2+}$. To dope $Fe_2O_4$, we will need elements like $Cr^{3+}$ or $Rh^{3+}$. Stated another way, the ternary host compound can have two different ionic charge states of the same element $M(1)M_2(2)O4$. the first dopant is chosen to replace $M(1)$ and have the same ionic charge state as $M(1)$ and the second dopant is chosen to replace and have the same ionic charge state as $M_2(2)$.

The introduction of a magnetic impurity in magnetic nanoparticles creates the perfect magnetic nanoparticle where all the spins are aligned. We have thus converted transition metal oxide based paramagnetic material to a strong ferromagnetic material in the range 10-20 nm, in contrast to nanomaterial that was not doped. In doing so, we created a statistical distribution of hard (doped) and soft (undoped) magnets which forms the back bone of Nanocomposite of hard and soft (NC-HS) magnets. The alignment of all core and surface spins in nanocrystal of ~20 nm, makes it highly resistive to reversal of magnetic field, yielding high coercivity needed for NC-HS magnets.

If nanoparticles are in close proximity, exchange interactions between surface atoms can be significant. We have demonstrated that by incorporating a single magnetic dopant, surface spins are also aligned thereby eliminating the 'magnetically-dead surface layer' in nanoparticles. This makes the discovery of doped magnetic nanoparticles (DMNP) a breakthrough for the development of NC-HS based permanent magnets because the magnetic properties associated with surface spins is crucial to integration of soft and hard magnet for PM in the size range of 10-20 nm. Because of the exchange coupling at the soft/hard interface, the magnetic moments at the soft phase boundary have to align with the adjacent moment in hard phase. The regions close to the interface via exchange coupling create a chain of magnetic nanomagnets.

Figure 1:
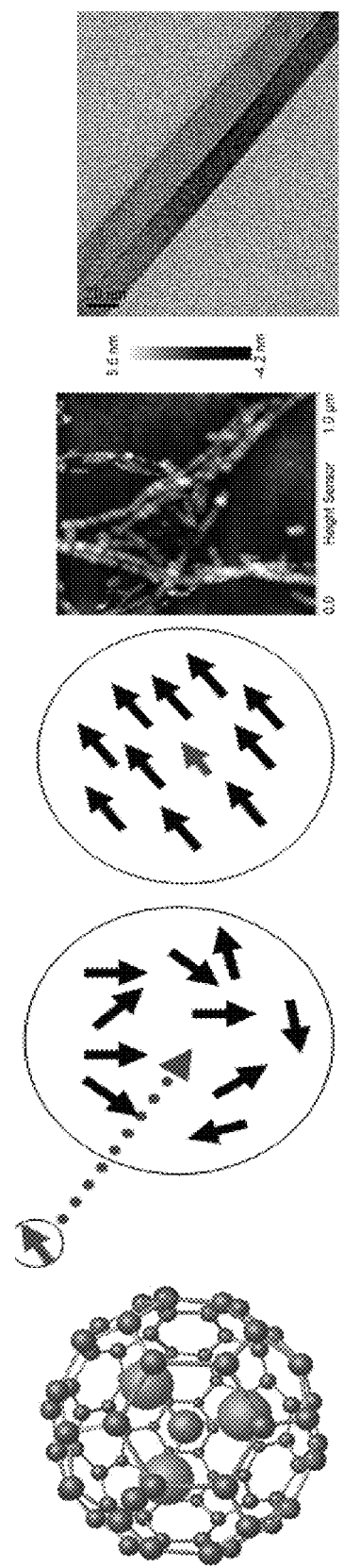
FIGS. 1A, 1B, 1C 1D and 1E Depict the introduction of an magnetic dopant-spin shown as an arrow (FIG. 1B) in a magnetic nanoparticle (FIG. 1A) creates a magnetic nanoparticle where all the spins are aligned (FIG. 1C). These nanoparticles self-organize (FIG. 1D) to yield a nanomagnet (FIG. 1E) thus converting metallic oxide paramagnetic material to a strong ferromagnetic material to yield higher magnetic moment and larger coercivity.
Figure 2:
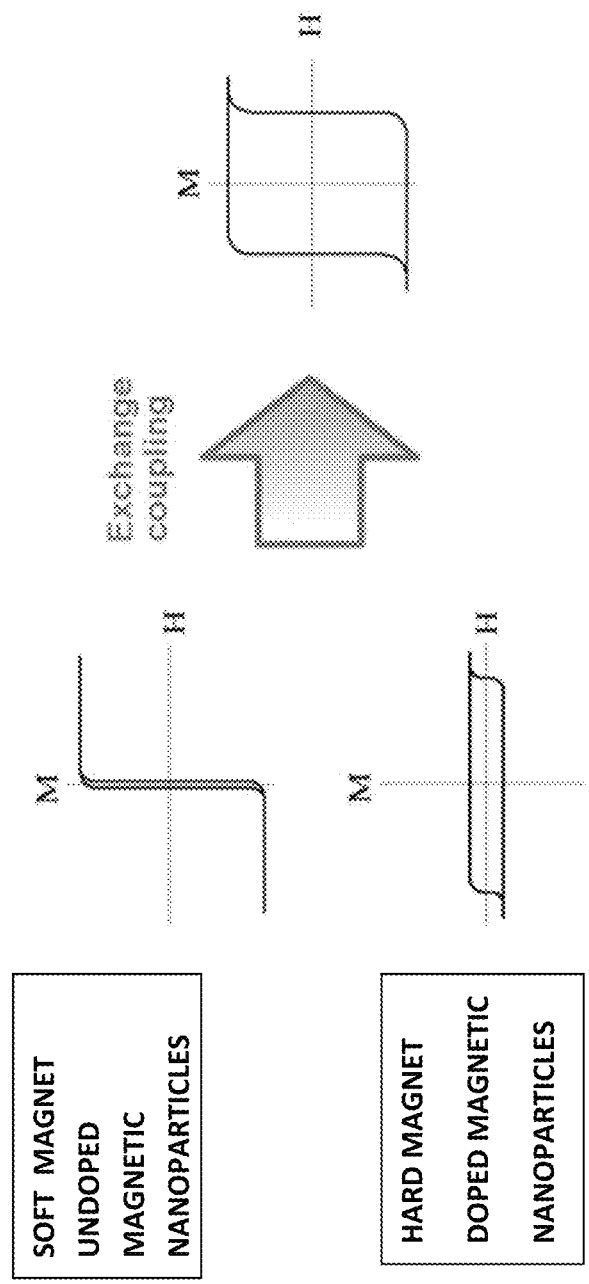
FIG. 2 Depicts the integration of soft phases and hard phases of magnetic nanomaterials are integrated, the resultant final product increases the figure of merit $BH_{max}$ (shown the area of M-H curve in the fourth quadrant)
Figure 3:
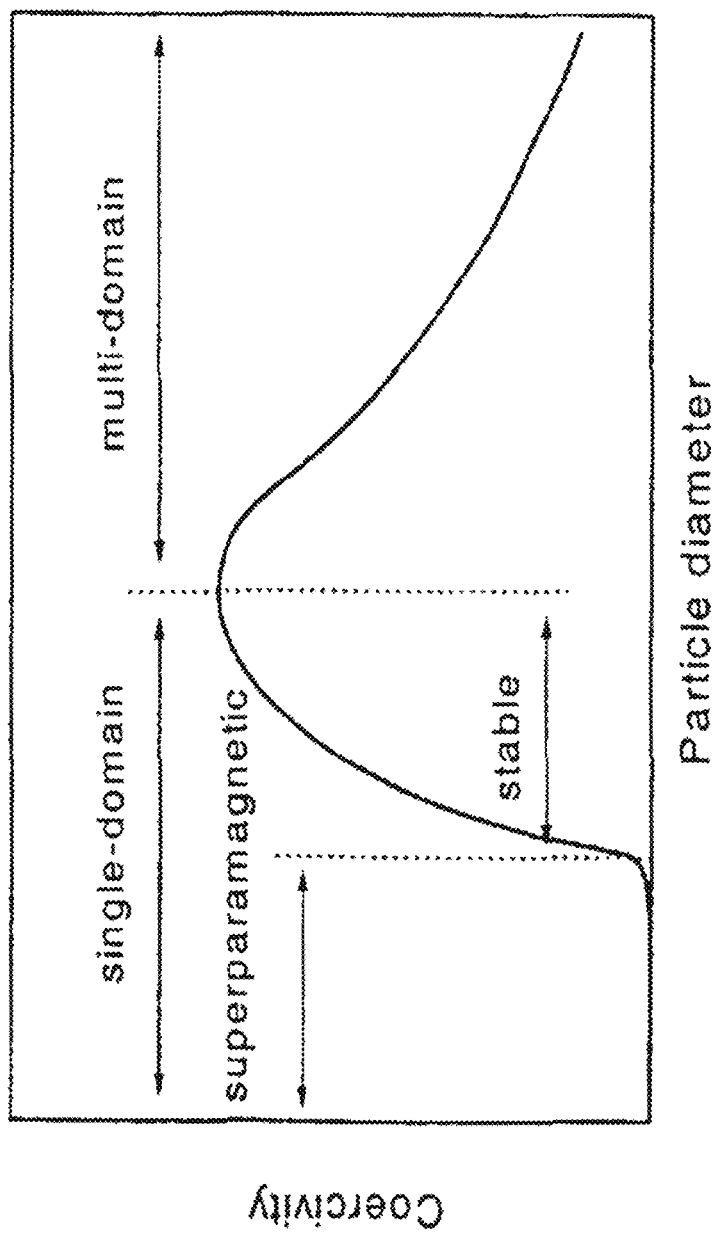
FIG. 3. Depicts the dependence of Coercivity in nanosize materials, with the sub-division of single domain and multi-domain regions. The critical size where Hc reduces to zero in nano-material such as metals or oxides. For example, for $Fe_3O_4$ this size about 30 nm while for $CoFe_2O_4$ this is about 15 nm.
Figure 4:
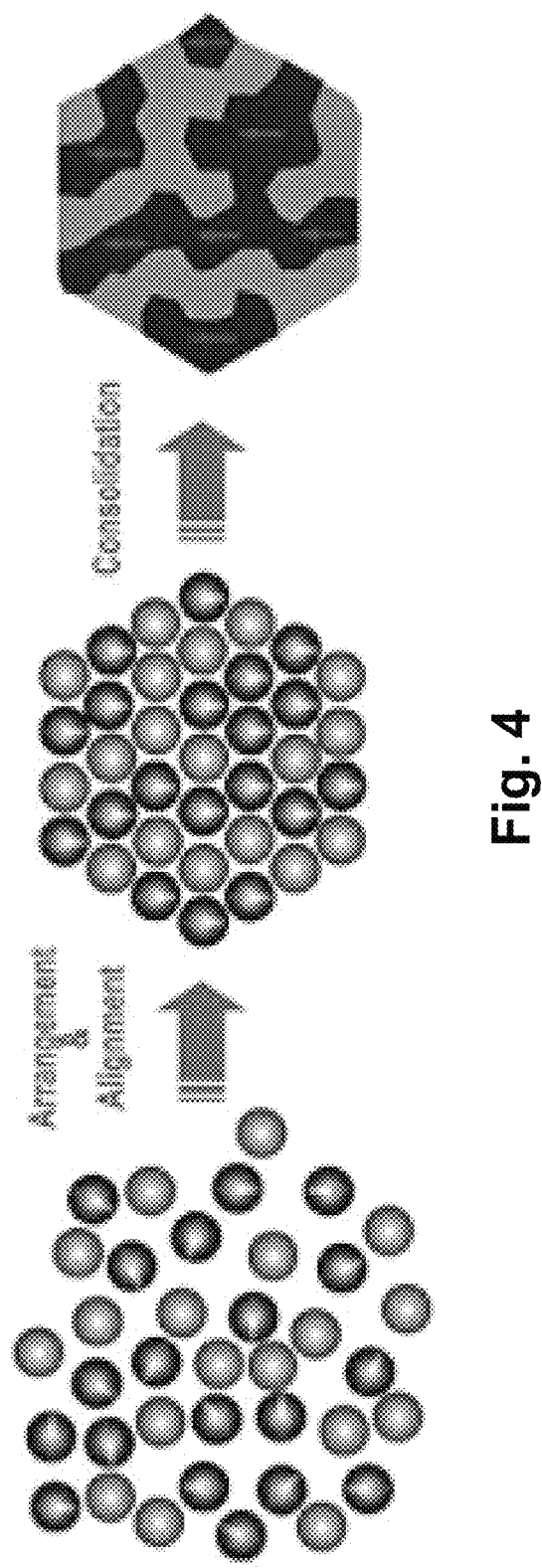
FIG. 4 Depicts the assembly of a DMNP based hard/soft permanent magnet.

We have developed a way to synthesize by a singular process, an agglomerate of soft and hard nanomagnet in the size of 20 nm with identical crystal structure. In the process, DMNP based nanomagnets are synthesized in presence of appropriate dopants. The dopant concentration is typically about 1% or less. In the case of $Mn_3O_4$, $Fe^{2+}$ was used as the dopant. Results show that $Mn_3O_4$, $Fe^{2+}$ nanoparticles show enhanced coercivity (200 Oe) and Curie temperature about 800 C. In general for developing NC-HS magnetic system, we need to have the following:

1. In this doping process of magnetic nanoparticles, statistically dopants get incorporated in less than 40% of the nanoparticles. We have a distribution of doped nanoparticles (hard magnets <40%) and undoped nanoparticles (soft magnets).
2. We have hard and soft magnetic nanoparticles of in the size range of 10 to 20 nm.
3. Both hard and soft magnets have the same crystal structure with the hard magnet having a well defined magnetic axis. (cf. FIG. 2).
4. As depicted in FIG. 2, the aligned magnetic axis, and hence the creation of macro-magnet is much simpler integration process. Alignment of magnetic axes of an ensemble of nanomagnets will result in large magnetic anisotropy and powerful magnets.
5 Since the magnetic axes of these nanomagnets are strongly correlated and well aligned, the magnetic properties of the present magnets will weakly depend on temperature i.e. better performance at high temperatures (~500 C), desirable feature of future permanent magnets.
6. Nanopowder based materials will enable the molding of complex magnet shapes using additive manufacturing.
7 These nanomagnet powders are synthesized at temperatures between 50 C to 200 C enabling cost-effective, scalable and non-toxic process.
8. As a comparison to the rare-earth metallic system, the present nanomagnets are oxide-based i.e. no corrosion, as in the case of RE metal based magnets.
9 These transition metal oxides based magnets will be lighter than RE metals.

Integration of doped ferromagnetic nanoparticle (hard) and undoped paramagnetic and/or superparamagnetic nanoparticle (soft) leads to NC-HS system. This is schematically shown in FIG. 5 as nanocomposite of hard (blue) and soft (green) magnets. Choice of Material Our earlier PCT application PCT/US2018/019458 on $Fe^{2+}$ doping of $Mn_3O_4$ provided the following teachings:

1. Replacing $Mn^{2+}$ with $Fe^{2+}$ in $Mn_3O_4$ nanoparticles helps us align all the $Mn^{2+}$ and $Mn^{3+}$ spins in the same direction, thereby converting the Ferrimagnetic/Paramagnetic $Mn_3O_4$ to a strong ferromagnetic nanoparticle.
2. These nanoparticles with all aligned spins, both in the core and at the surface, provide for the first time, ferromagnetic nanoparticles that form nanorods i.e. nanomagnets.
3. To improve the ferromagnetic properties of DMNP, we chose a ferromagnetic system such as Cobalt ferrite nanoparticle that exhibit decent ferromagnetic materials. Cobalt ferrite is chemically expressed as $CoFe_2O_4$. Another way to express is as a mixture of two compounds $CoO+Fe_2O_3$, which identifies the charge of the ions (oxidation state) In CoO, Co charge state is $CO^{2+}$. Hence in the doping scheme, we can replace $Co^{2+}$ with $Mn^{2+}$. By incorporating the dopant $Mn^{2+}$ to replace $Co^{2+}$, we expect the magnetic properties of doped Cobalt ferrite to improve significantly as obtained and tabulated in table 1.
4. In another embodiment we use a dopant like $Cr^{3+}$ to replace $Fe^{3+}$ in $Fe_2O_3$ This will constitute a 'double doping' scheme in a ternary nanoparticle of $CoFe_2O_4$.
5. These nanomagnets can be magnetically organized under a applied magnetic field, isostatic pressure and temperatures between 50 C to 500 C to create a bulk magnet.
6. Each of the processing steps, that are used to convert the magnetic nanopowder into a bulk magnet, will need the presence of an applied high magnetic field at all times. This is to keep the nanomagnet structure strongly aligned for a well directed magnetic axis. Ensemble of these nanomagnets with a unique magnetic axis, will result in a powerful permanent magnets.
7. Use of polymer/resin bonding material can be utilized to create bonded magnets and it is anticipated that they will yield reasonable-permanent magnets
8. The ternary system should have preferably highly anisotropic crystalline axis for improved magnetic properties. Such a structure is provided by a spinel or inverse spinel crystal structure. We decided the work with well known material Cobalt ferrite with formula $CoFe_2O_4$.

To develop a permanent magnet from nanocrystal hard-soft (NC-HS) with DMNP, we have a choice ferrite system with inverse spinel structure with tetrahedral and Octahedral coordination.

In the earlier PCT application we had demonstrated that paramagnetic $Mn_3O_4$ nanoparticles can be converted to a high temperature ferromagnetic nanoparticles. However, the coercivity Hc was limited to about 200 Oe. If the starting material was $Fe_3O_4$ and the dopant was $Mn^{2+}$, the coercivity was increased to 500 Oe. We have demonstrated that system like cobalt ferrite the coercivity increased from 1,000 Oe to 3,500 Oe when it was doped with 5% $Mn^{2+}$. The process to achieve high coercivity is summarized first in the table below.

This application is directed to improvement of our earlier work by the incorporation of two dopants in a ternary compound which greatly improves the magnetic properties.

TABLE 1

Doped magnetic nanoparticles for permanent magnets

| Chemical System | Formula | Dopant | Coercivity Hc (Oe) | Permanent Magnet |
|---|---|---|---|---|
| Ternary with same elements with two different oxidation states | $Mn_3O_4$ $Fe_3O_4$ | $Fe^{2+} \rightarrow Mn^{2+}$ $Mn^{2+} \rightarrow Fe^{2+}$ | 0 → 200 ~10 → 500 | No |
| Ternary-Compound Single Dopant | $CoFe_2O_4$ as CoO $Fe_2O_3$ | $Mn^{2+} \rightarrow Co^{2+}$ | 1000 → 3000 | Moderate |
| Ternary- | $CoFe_2O_4$ | $Mn^{2+} \rightarrow Co^{2+}$ | 1000 → | Strong |

TABLE 1-continued

Doped magnetic nanoparticles for permanent magnets

| Chemical System | Formula | Dopant | Coercivity Hc (Oe) | Permanent Magnet |
|---|---|---|---|---|
| Compound Double dopants | as CoO $Fe_2O_3$ | $Cr^{3+}$ or $Rh^{3+} \rightarrow$ $Fe3+$ | 10000** | |

**These values of coercivity are anticipated for double doping

Enhancement of coercivity by double doping is expected to increase the magneto-crystalline anisotropy which is the key factor for improving the performance of permanent magnets including from spring exchange effect. The above table designates the different doping possibilities that will yield nanomagnets which when integrated efficiently will yield high performing permanent magnets that will supersede the performance of rare-earth Nd based magnets. We are proposing a $Fe_3O_4$ nanoparticles (which can be considered as a ternary compound as described above) be doped with $Mn^{2+}$ or $Co^{2+}$ for $Fe^{2+}$ in FeO and dopant $Cr^{3+}$ to replace $Fe^{3+}$ in $Fe_2O_3$. Thus, dopants such as $Mn^{2+}$ or $Co^{2+}$ and $Cr^{3+}$ are incorporated at both substitutional sites $Fe^{2+}$ and $Fe^{3+}$, respectively in $Fe_3O_4$. All above compounds have been chosen because they have spinel structures that consist of a tetrahedral and octahedral coordinated structure. When Co in tetrahedral is replaced by $Mn^{2+}$, we propose that the spin-axis gets more aligned with the crystalline axis. In case of replacement of $Fe^{3+}$ in octahedral with $Rh^{3+}$ or $Cr^{3+}$ we expect more alignment of the magnetic axis with crystalline axis. Thus double doping would proportionally increase the net coercivity as proposed above.

In all cases of doping, we must maintain charge neutrality of the dopant atom with respect to the host atom. Additionally, the ion size must match. For example, $Mn^{2+}$ has ionic radius size of 0.8 pm (picometer), which corresponds well with the $Co^{2+}$ ionic radius size of 0.74 pm. Similarly, $Fe^{3+}$ ionic radius size of 64 pm corresponds well with possible dopants $Rh^{3+}$ (ionic radius 0.67 pm) or $Cr^{3+}$ (ionic radius size 0.69 pm). Double doping using $Mn^{2+}$ for $Co^{2+}$ and $Rh^3$ for $Fe^3$ respectively, could have a strong effect on the spin alignment and subsequently on the coercivity of doped Co ferrite system.

Preparation of Mn Doped Co Ferrite

Dopant incorporation in nanocrystals in the size range of 5-30 nm is not an equilibrium process rather it is more statistical, in particular, when we are want to incorporate a single $Mn^{2+}$ at $Co^{2+}$ site in Co-ferrite. Normally Co-ferrite is ferromagnetic To incorporate a dopant in a nanoparticle host, certain basic requirements are to be satisfied (as mentioned above) (i) the charge of the dopant ion must be the same as the host ion it replaces; (ii) the ionic radius of the dopant ion should be similar to host ion; and (iii) the magnetic moment of the dopant ion should be significant so as to generate a substantial magnetic field at nearest neighbor atoms when confined in the nanoparticle. $Mn^{2+}$ as a dopant satisfies all the conditions to replace $Co^{2+}$ in $CoFe_2O_4$ and impacts the ferromagnetic nanoparticles. As an example, we used a process where we dissolve $FeCl_2$ and $CoCl_2$ in 2 to 1 molar ratio in deionize water to which we mix 5% of $MnCl_2$. After mixing the above the temperature is raised to 80° C. and then NaOH is added to the above solution drop-wise until reaching a pH~12 at which time a precipitate appears. After stirring for over 12 hours at room temperature the precipitate was separated using a centrifuge. The precipitate was washed multiple times and dried at 80 C which was characterized for magnetic and structural properties. We performed a series of experiments to assess the magnetic properties of this powder of these nanoparticles. The vibrating sample magnetometer (VSM) measurements showed that a saturation magnetization of 69.3 emu/gm with saturation field greater than 2.1 T (21,000 Oe). At 300 K temperature, coercivity was measured to be 3133 Oe (table1).

Permanent Magnets from DMNP Nanopowder

How to increase the coercivity and $BH_{max}$ to a value beyond the values that rare-earth (RE) permanent magnet possess. To achieve, we advance the process whereas we could make simultaneously doped and undoped magnetic nanoparticles and fabricate NC-HS magnets. In order to increase the energy product $BH_{max}$ beyond the 200 $KJ/m^3$ from our nanomagnets it is necessary that we i) Increase the coercivity to a value about 10,000 Oe and ii) increase the remanence magnetization >10 kG.

Our DMNP nanopowder consist of nanoparticles with following properties; i) the size of these nanoparticles vary from 5 to 30 nm and agglomerated nanorods as much as 5 micron in size. ii) These nanorods are made of nanoparticles which are either ferromagnetic and/or superparamagnetic. The wide variation of size and strength of magnetization can be enlisted as two category of magnetic materials, soft phase and hard phase. when a hard phase to be exchange-coupled with a soft phase, remanence magnetization can be increased to yield a value >10 kG. We have fortunately both of these phases in our DMNP nanopowder. A Combination of soft and hard phase when used to properly assemble permanent magnets could not only yield higher energy product $BH_{max}$ but also a better temperature dependence.

To assemble the permanent magnets, currently two procedures are followed. Use of sintering at high temperatures with large isostatic or uniaxial pressure. Post magnetization under high magnetic field yields the final permanent magnet. Alternatively, the particles are mixed with a binding agent, hot pressed and then post magnetization under high magnetic field. In our case, we are using the latter scheme referred to as bonded permanent magnet. This has the advantage that we can simultaneously align the nanorods and compress them under the applied magnetic field to create a well-directed magnetic axis.

The evolution of next generation permanent magnets can be seen as coming from ternary DMNP system where $Co^{2+}$ in $CoFe_2O_4$ is replaced by $Mn^{2+}$ and concurrently, $Fe^{3+}$ is replaced by $Rh^{3+}$ or $Cr^{3+}$. This double doping will align the magnetic axis with crystalline axis, eliminating the canting angle between the two. Such a magnetic alignment involving tetrahedral as well as octahedral coordination in spinel structure of $CoFe_2O_4$ could increase the performance of permanent magnet due to optimization of enhanced coercivity and magneto-crystalline anisotropy due to double doping.

Advantages of Double Doped Co-Ferrite
1. DMNP based nanomagnets have already a well aligned magnetic axis, and hence the creation of macro-magnet is much simpler integration process. Alignment of magnetic axes of an ensemble of nanomagnets will result in large magnetic anisotropy and powerful magnets.
2. Since the magnetic axes of these nanomagnets are strongly correlated and well aligned, the magnetic properties of our magnets will depend weakly on temperature i.e. they would perform better at high temperatures, a desirable feature.

3. Nanopowder will enable to mold complex magnet shapes.
4. These nanomagnet powders are synthesized at temperatures between 50 C to 200 C a cost-effective, scalable growth process.
5. As a comparison to the rare-earth metallic system, our nanomagnets are oxide-based i.e. no corrosion, as in the case of RE metal based magnets.
6. These transition metal oxides based magnets will be lighter than RE metals.

Summarized above are the properties of current magnetic materials and the critical parameters that control the performance of magnets in use. In particular, rare-earth magnets are expensive and dominate the market for high performance applications. Our discovery of doped magnetic nanoparticles (DMNP) using commonly available magnetic materials and a magnetic dopant, has resulted in nanosize magnetic material with enhanced magnetic parameters that will be in the same range as the best rare-earth Nd-magnets as listed in the table below. These are Hc, the magnetic-resistance to turning the direction of magnetization 180°, Curie point $T_e$, the temperature at which the material loses its magnetic properties since the alignment of spins disappears at higher temperatures, and Maximum Energy Product ($BH_{max}$ is an Energy Density) is a commonly used for figure of merit of magnets.

Our nanomagnets will have additional advantages over the conventional magnets, since they are small, light weight, possess large magnetic anisotropy and are thermally stable.

This invention provides a new class of magnetic materials by double doping of ternary host (introducing two impurity atoms) of known paramagnetic, ferrimagnetic or ferromagnetic nanomaterials to develop a high temperature nanomagnet. By introducing two dopants, in a ferromagnetic ternary system such as $CoFe_2O_4$ where $Co^{2+}$ can be replaced by $Mn^{2+}$ and $Fe^{3+}$ is replaced by $Cr^{3+}$. Thus in ternary nanomaterials we achieve, by double doping, high coercivity and remanence magnetization to create a high energy product permanent magnet that will operate at high temperatures. In fact, the doping of magnetic nanoparticles has created a true nanocomposite of hard and soft magnets which when integrated will surpass the performance of RE-based permanent magnets. These nanomagnetic hard and soft nanomaterials when integrated into bulk magnets, will yield powerful paramagnets for future electric vehicles, magnetic storage devices, sensitive electro-mechanical sensors and many more applications.

The present invention has been described with respect to the above exemplary embodiments, However, as those skilled in the art will recognize, modifications and variation sin the specific details which have been described may be resorted to without departing from the spirits and scope of the invention as defined in the appended claims.

The invention claimed is:

1. A magnetic nanoparticle comprising
a ternary host compound of a transition metal oxide having two different ionic charge states $M_1^{2+}M_2^{3+}O_4$ of size 2-30 nm having two transition metal dopant atoms incorporated therein, wherein the dopant atom is chosen to be different from M but having the same ionic charge state
the ternary host compound $M_1^{2+}M_2^{3+}O_4$, where $M_1^{2+}$ in the host is replaced by a dopant selected from the remaining other host compounds transition metal ions of divalent charge state 2+, the transition metal $M_2^{3+}$ in the ternary host is replaced by a dopant selected from the group of: $Cr^{3+}$ and $Rh^{3+}$, such that the nanoparticle is converted from superparamagnetic or weak ferromagnetic to strong ferromagnetic material.

2. The nanoparticle as claimed in claim 1, wherein the ternary host is $MFe_2O_4$, and M is a transition metal selected from the group of: $Fe^{2+}$, $Mn^{2+}$, $Co^{2+}$ or $Ni^{2+}$.

3. The nanoparticle as claimed in claim 1 wherein the dopants for ionic charge state 2+ are selected from the group of: $Fe^{2+}$, $Mn^{2+}$, $Co^{2+}$ and $Ni^{2+}$.

4. A magnetic nanoparticle comprising:
a ternary transition metal oxide host compound in the range of 2-30 nm having two transition metals $M_1^{2+}M_2^{3+}O_4$ where $M_1$ is a transition metal ion selected from divalent group $Fe^{2+}$, $Mn^{2+}$, $Co^{2+}$ and $Ni^{2+}$ and $M_2$ is a transition metal ion selected from trivalent $Fe^{3+}$, $Cr^{3+}$ and $Rh^{3+}$,
the transition metal $M_1^{2+}$ in the host is replaced by a dopant selected from the remaining other host compounds transition metal ions of divalent charge state 2+
the transition metal $M_2^{3+}$ in the host is replaced by a dopant selected from the remaining other host compounds transition metal ions of trivalent charge state 3+, respectively
the incorporation of dopant ions of charged state 2+ or 3+ replacing the corresponding host of the same charge-state, converting superparamagnetic or weak ferromagnetic nanoparticles to ferromagnetic nanoparticles.

\* \* \* \* \*